Jan. 29, 1935.   G. E. BEHNKE   1,989,261
ROLLER BIT
Original Filed Dec. 1, 1932

Guy E. Behnke
    INVENTOR.

BY *J. Vincent Martin*
    ATTORNEY.

Patented Jan. 29, 1935

1,989,261

UNITED STATES PATENT OFFICE 1,989,261

ROLLER BIT

Guy E. Behnke, Oklahoma City, Okla., assignor to Reed Roller Bit Company, Houston, Tex., a corporation of Texas Original application December 1, 1932, Serial No. 654,143. Divided and this application August 27, 1934, Serial No. 741,624

3 Claims. (Cl. 255—71)

This invention relates generally to deep well drilling apparatus, and specifically to roller bits, the present application being a division of my application Serial Number 654,143, filed December 1, 1932, which has matured into Patent Number 1,972,256, granted September 4, 1934.

The invention disclosed by the present application has for its object the provision of new and improved bearings for roller cutters, and will be found particularly useful in that conventional type of roller bit including a head having a substantially V-shaped cutter recess in the bottom thereof, and substantially conical cutters in said recess.

A specific object of this invention is the provision of new and improved means whereby three rows of balls may be efficiently utilized to support and rotatably secure a cone cutter in bits of the type referred to.

Figure 1:
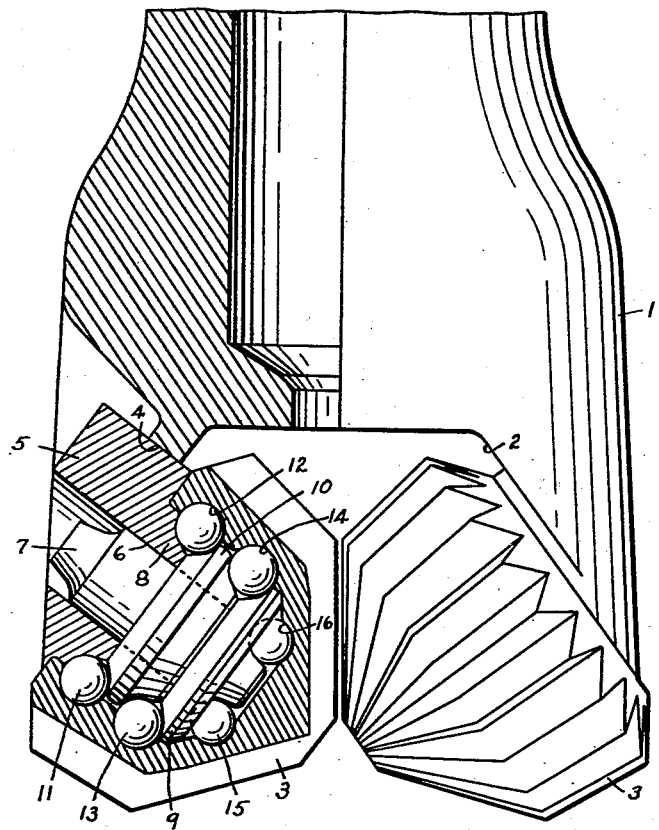
Figure 2:
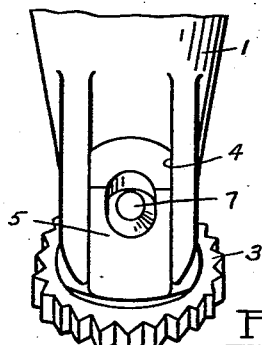

The preferred embodiment of the invention is illustrated by the accompanying drawing, of which Fig. 1 is a partly sectional side elevation, and Fig. 2 is a detail view taken at a right angle to Fig. 1.

In the drawing the bit head is indicated at 1. It has in its lower end a substantially V-shaped recess 2 for the reception of the substantially conical roller cutters 3. Each of these cutters is mounted in the head by means which will now be described.

In the wall of the recess is a downwardly opening slot 4 for the reception of a cutter support 5 which may be removably welded therein. The support 5 has an opening 6 to receive the cutter pin 7, which may be removably welded therein, and an annular flange 8 projecting downwardly and inwardly into the recess 2 and surrounding the pin 7. The pin 7 has an annular flange 9, and disposed between the support flange 8 and the pin flange 9 is a removable ring 10. The support flange 8 and removable ring 10 form a raceway for balls 11 in raceway 12 of cutter 3. The removable ring 10 and flange 9 form a raceway for the balls 13 in the raceway 14 of the cutter 3. The flange 9 forms a raceway for the balls 15 in the raceway 16 of the cutter 3.

The advantages of this bearing construction will be apparent to those skilled in the art.

I claim:

1. A roller bit having a head, said head having a cutter recess, a support removably secured to said head, a pin removably secured to said support, and a cup-shaped cutter enclosing said pin, said support having an annular flange surrounding said pin and projecting downwardly and inwardly into said recess, a ring on said pin and having rounded opposite sides and bearing against the flange of said support, said pin having an annular flange bearing against said ring, said pin flange having rounded portions on its opposite sides, said support flange and ring forming a first ball raceway, said ring and pin flange forming a second ball raceway, and said pin and pin flange forming a third ball raceway, said cutter having first, second and third ball raceways, and balls in said raceways to form a bearing and to rotatably lock said cutter on said pin.

2. A roller bit having a support, a pin removably secured to said support, and a cup-shaped cutter enclosing said pin, said support having an annular flange surrounding said pin, a ring on said pin and having rounded opposite sides and bearing against the flange of said support, said pin having an annular flange bearing against said ring, said pin flange having rounded portions on its opposite sides, said support flange and ring forming a first ball raceway, said ring and pin flange forming a second ball raceway, and said pin and pin flange forming a third ball raceway, said cutter having first, second and third ball raceways, and balls in said raceways to form a bearing and to rotatably lock said cutter on said pin.

3. A roller bit having a support, a pin removably secured to said support, and a cup-shaped cutter enclosing said pin, said support having an annular flange surrounding said pin, a ring on said pin and bearing against the flange of said support, said pin having an annular flange bearing against said ring, said support flange and ring forming a first ball raceway and said ring and pin flange forming a second ball raceway, said cutter having first and a second ball raceways, and balls in said raceways to form a bearing and to rotatably lock said cutter on said pin.

GUY E. BEHNKE.